United States Patent
Park et al.

(10) Patent No.: US 9,414,343 B2
(45) Date of Patent: Aug. 9, 2016

(54) METHOD AND APPARATUS FOR SYNCHRONIZATION FOR DEVICE-TO-DEVICE COMMUNICATION IN UNLICENSED FREQUENCY BANDS

(71) Applicant: Samsung Electronics Co., Ltd., Suwon-si, Gyeonggi-do (KR)

(72) Inventors: Seung-Hoon Park, Seoul (KR); Young-Bin Chang, Anyang-si (KR); Chi-Woo Lim, Suwon-si (KR); Hyun-Seok Ryu, Yongin-si (KR); Kyung-Kyu Kim, Suwon-si (KR); Dae-Gyun Kim, Seongnam-si (KR); Sang-kyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 14/266,219

(22) Filed: Apr. 30, 2014

(65) Prior Publication Data
US 2014/0321438 A1 Oct. 30, 2014

(30) Foreign Application Priority Data

Apr. 30, 2013 (KR) .................. 10-2013-0048401

(51) Int. Cl.
*H04W 56/00* (2009.01)
(52) U.S. Cl.
CPC .................. *H04W 56/002* (2013.01)
(58) Field of Classification Search
CPC ............ H04W 56/002; H04W 56/001; H04W 56/0015; Y02B 60/50
USPC ................... 370/310, 328, 329, 336
See application file for complete search history.

(56) References Cited

U.S. PATENT DOCUMENTS

| | | | |
|---|---|---|---|
| 2005/0181823 A1 | 8/2005 | Haartsen | |
| 2009/0017829 A1* | 1/2009 | Laroia | H04W 16/12 455/446 |
| 2010/0091670 A1 | 4/2010 | Uln et al. | |
| 2010/0118698 A1* | 5/2010 | Yokobori | H04W 74/085 370/230 |
| 2011/0039495 A1* | 2/2011 | Sawai | H04W 52/16 455/62 |
| 2012/0026941 A1* | 2/2012 | Ahmad | H04W 48/16 370/328 |
| 2012/0196608 A1 | 8/2012 | Ting et al. | |
| 2012/0320759 A1* | 12/2012 | Shao | H04W 24/02 370/242 |
| 2013/0083779 A1 | 4/2013 | Ahn et al. | |
| 2013/0272262 A1* | 10/2013 | Li | H04W 28/02 370/330 |
| 2013/0336156 A1* | 12/2013 | Wei | H04L 5/001 370/252 |

(Continued)

FOREIGN PATENT DOCUMENTS

| | | |
|---|---|---|
| WO | 2013/002688 A1 | 1/2013 |
| WO | 2013/008993 A1 | 1/2013 |

*Primary Examiner* — Chi H Pham
*Assistant Examiner* — Robert Lopata
(74) *Attorney, Agent, or Firm* — Jefferson IP Law, LLP (57) ABSTRACT

A method and an apparatus for synchronization for Device-to-Device (D2D) communication in unlicensed frequency bands are provided. The method includes determining whether a signal is detected during a preset time period within a synchronization period, after transmitting a synchronization signal during the synchronization period for the D2D communication, when it is determined that the D2D communication is to be performed, and starting the time period for the D2D communication and performing the D2D communication during the time period for the D2D communication, when it is determined that the signal is not detected.

12 Claims, 7 Drawing Sheets

(56) References Cited

U.S. PATENT DOCUMENTS

| | | | |
|---|---|---|---|
| 2014/0036881 A1* | 2/2014 | Kim | H04L 5/001 370/336 |
| 2014/0112332 A1* | 4/2014 | Park | H04W 56/002 370/350 |
| 2014/0140314 A1* | 5/2014 | Wei | H04W 48/12 370/329 |
| 2014/0307642 A1* | 10/2014 | Wanstedt | H04W 76/023 370/329 |
| 2014/0378157 A1* | 12/2014 | Wei | H04W 72/1215 455/454 |
| 2015/0043520 A1* | 2/2015 | Sun | H04L 5/001 370/330 |
| 2015/0078369 A1* | 3/2015 | Khude | H04W 56/0002 370/350 |
| 2015/0124579 A1* | 5/2015 | Sartori | H04J 11/00 370/210 |
| 2015/0156619 A1* | 6/2015 | Fodor | H04W 8/005 455/434 |
| 2015/0223257 A1* | 8/2015 | Wilhelmsson | H04W 76/023 455/452.1 |
| 2015/0245301 A1* | 8/2015 | Dahlman | H04W 8/005 455/426.1 |

\* cited by examiner

METHOD AND APPARATUS FOR SYNCHRONIZATION FOR DEVICE-TO-DEVICE COMMUNICATION IN UNLICENSED FREQUENCY BANDS

CROSS-REFERENCE TO RELATED APPLICATION(S)

This application claims the benefit under 35 U.S.C. §119 (a) of a Korean patent application filed on Apr. 30, 2013 in the Korean Intellectual Property Office and assigned Serial number 10-2013-0048401, the entire disclosure of which is hereby incorporated by reference.

TECHNICAL FIELD

The present disclosure relates to a method and an apparatus for synchronization for device-to-device communication in unlicensed frequency bands.

BACKGROUND

In a typical mobile communication system, various methods for system level synchronization have been conducted in order to increase network efficiency and reduce power consumption.

For example, when a base station includes a Global Positioning System (GPS), the base station may perform an operation of synchronizing the base station with communication target devices by using a global time point according to the GPS as a reference. However, mobile ad-hoc networks or Device-to-Device (D2D) networks do not include a separate GPS, and thus have difficulty in performing synchronization according to the above-described method.

Particularly, in unlicensed frequency bands, legacy devices operating in different communication standards coexist. Accordingly, devices intending to perform D2D communication in unlicensed frequency bands all require a specific synchronization scheme in which the devices can perform the D2D communication while the devices coexist with the existing legacy devices.

Accordingly, a method and an apparatus for synchronization for unlicensed Device-to-Device (D2D) communication in a case where legacy devices coexist is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to propose a method and an apparatus for synchronization for unlicensed Device-to-Device (D2D) communication in a case where legacy devices coexist.

Another aspect of the present disclosure is to provide a method and an apparatus for temporarily stopping a synchronization process and configuring a time period for D2D communication after achieving synchronization between multiple devices when not only the one device but also the multiple devices simultaneously recognize the occurrence of interference while simultaneously performing the synchronization process.

In accordance with an aspect of the present disclosure, a method for synchronization for D2D communication in unlicensed frequency bands is provided. The method includes determining whether a signal is detected during a preset time period within a synchronization period, after transmitting a synchronization signal during the synchronization period for the D2D communication, when it is determined that the D2D communication is to be performed, and starting the time period for the D2D communication and performing the D2D communication during the time period, when determined that the signal is not detected.

In accordance with another aspect of the present disclosure, a device for performing synchronization for D2D communication in unlicensed frequency bands is provided. The device includes a transmission/reception unit configured to transmit a synchronization signal during the synchronization period for the D2D communication, when it is determined that the D2D communication is to be performed, and a control unit configured to determine whether a signal is detected during a preset time period within a synchronization period, and to configure the time period for the D2D communication and perform the D2D communication during the time period, when it is determined that the signal is not detected.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Synchronization schemes in unlicensed frequency bands may be largely divided into contention-based channel access scheme and a contention-free-based channel access scheme.

Figure 1:
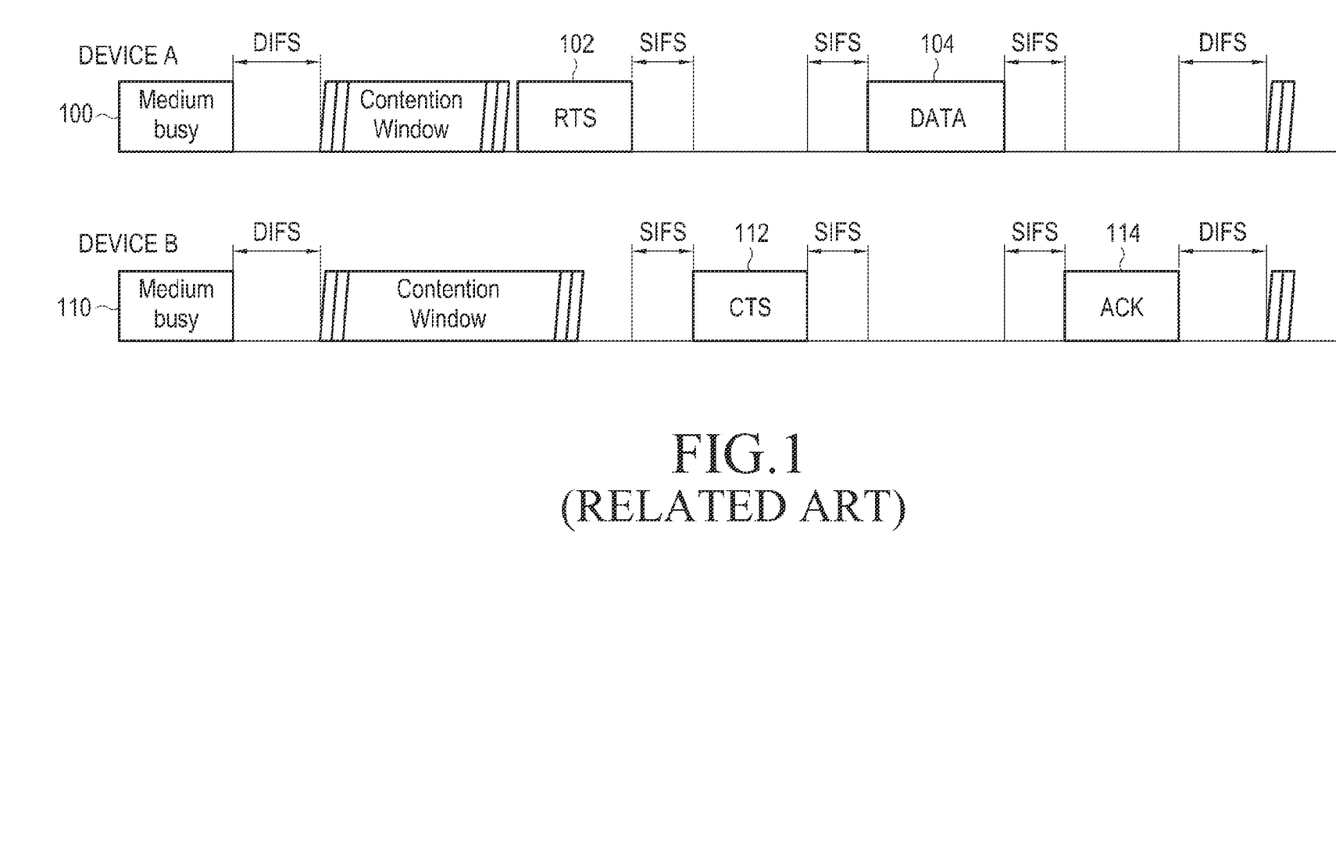
FIG. 1 is a view illustrating an example of a typical contention-based channel access process according to the related art.

FIG. 1 is a view illustrating a contention-based channel access process according to the related art.

Referring to FIG. 1, for convenience of description, an example will be described of an operation of accessing a medium through transmission contention for possessing the medium based on a Carrier Sense Multiple Access/Collision Avoidance (CSMA/CA) scheme in a Wireless Local Area Network (WLAN).

Referring to FIG. 1, when a "medium busy" state or a "medium used" state in which a medium is being used has been completed, each of a device A 100 and a device B 110 enters a Distributed Coordination Function InterFrame Space (DIFS) period, and identifies whether the medium is being used. When a result of the identification shows that the medium being used does not exist, the each of the device A 100 and the device B 110 enters a Contention Window (CW) period, and reduces a predetermined backoff time period, when identifying that the medium is not being used. In FIG. 1, the device A 100 reaches a state, in which a backoff time period is equal to zero, earlier than the device B 110, and thus enters a period named Request to Send (RTS) 102. When consideration is given to a wireless environment state in which another signal being transmitted/received does not exist after a Short InterFrame Space (SIFS) following the RTS period 102, the device B 110 enters a period named Clear to Send (CTS) 112, and responds to an RTS transmitted by the device A 100. After the SIFS period, the device A 100 enters a DATA period 104 for transmitting data matched to the RTS to the device B 110. Again after the SIFS period, the device B 110 enters an ACK period 114, and responds to the transmission of data matched to the DATA period of the device A 100. Each of the device A 100 and the device B 110 again enters a DIFS period, and identifies whether a medium being used exists. When the medium is being used during the CW period, the relevant device increases the backoff time period by a predetermined unit. As described above, the typical contention-based channel access scheme is problematic in that throughput is reduced as the number of contentions increases.

Figure 2:
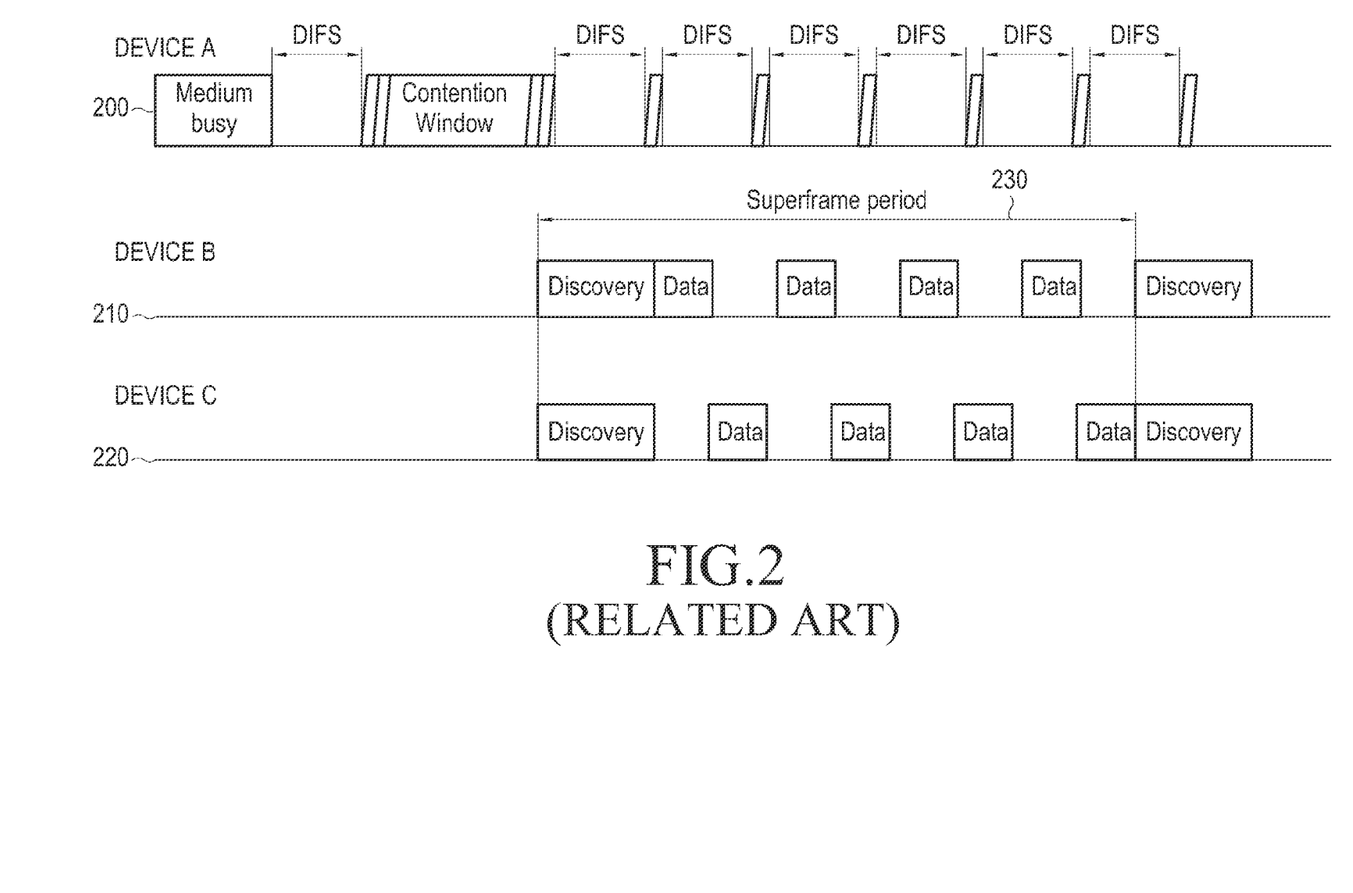
FIG. 2 is a view illustrating an example of a typical contention-free-based channel access process according to the related art.

FIG. 2 is a view illustrating a contention-free-based channel access process according to the related art.

Referring to FIG. 2, an example is described in which a device A 200 is a legacy device according to a Wi-Fi standard and a device B 210 and a device C 220 are devices intending to perform D2D communication. In the present example, the device A 200 performs the contention-based channel access process as described with reference to FIG. 1. Accordingly, the device A 200 senses a signal of another device, namely, a discovery signal of the device B 210 and that of the device C 220, during a CW period, and enters a DIFS period.

At this time, each of the device B 210 and the device C 220 recognizes that a D2D communication target exists during a discovery period by using a superframe structure 230, and performs D2D communication with the D2D communication target. The device A 200 senses the D2D communication, and thus continues to repeatedly maintain a DIFS period.

In the above-described contention-free-based channel access scheme, when D2D communication is performed, communication performed by another device continuously needs to be stopped during a period for which the D2D communication is performed. Accordingly, a problem arises in that it is difficult to coexist with a legacy device.

Therefore, various embodiments of the present disclosure propose a method and an apparatus for synchronization (hereinafter referred to as "D2D synchronization") capable of supporting channel access for D2D communication while coexisting with the existing legacy devices in unlicensed frequency bands. Hereinafter, in various embodiments of the present disclosure, consideration is given to a case of operating in the communication system environment illustrated in FIG. 3.

Figure 3:
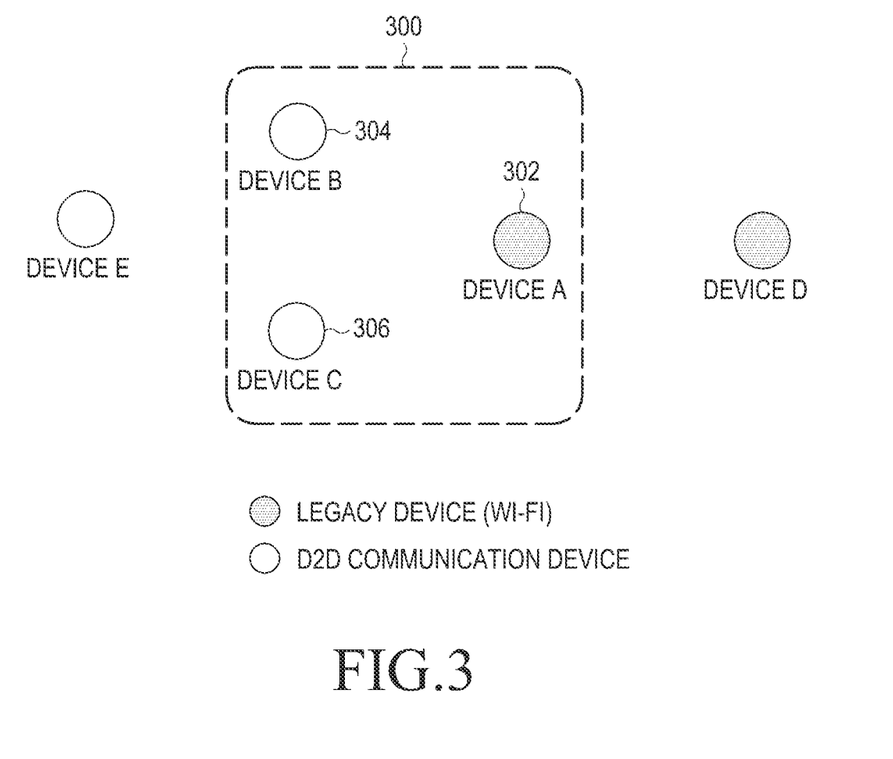
FIG. 3 is a view illustrating a communication system environment according to an embodiment of the present disclosure.

FIG. 3 is a view illustrating a communication system environment in unlicensed frequency bands according to an embodiment of the present disclosure.

Referring to FIG. 3, an example will be described of an environment in which there coexist a device A 302, which is a legacy device according to a Wi-Fi standard within a service coverage 300 of a WLAN, a device B 304, which is a D2D communication device operating according to an embodiment of the present disclosure, and a device C 306.

An embodiment of the present disclosure proposes a synchronization scheme for a D2D communication device capable of coexisting with legacy devices complying with, for example, a Wi-Fi standard in unlicensed frequency bands in the above-described environment. Specifically, in an embodiment of the present disclosure, a D2D communication device transmits and receives synchronization signals during a synchronization period (hereinafter referred to as a "D2D synchronization period") starting from a time point matched to a condition previously determined according to an embodiment of the present disclosure. At this time, consideration is given to a case in which a synchronization signal (hereinafter referred to as a "D2D synchronization signal") transmitted by the D2D communication device is set in the form of a signal, of which energy is not detected by the legacy devices, during the D2D synchronization period according to an embodiment of the present disclosure. For example, the D2D synchronization signal may be transmitted at a high power density over a narrower bandwidth than a reception bandwidth of each of the legacy devices. In another example, the D2D synchronization signal may be transmitted at a low power density over a wider bandwidth than the reception bandwidth of each of the legacy devices. In still another example, the D2D synchronization signal may be transmitted through a protection frequency band between the reception bandwidths of the legacy devices.

The D2D communication devices according to an embodiment of the present disclosure transmit and receive D2D synchronization signals to and from each other. Accordingly, the D2D communication devices adjust their own time references for D2D synchronization. When their own time references for D2D synchronization coincide with each other after a convergence time period required according to a predetermined D2D synchronization algorithm, time references of the D2D communication devices coincide with each other, and each of the D2D communication devices completes the D2D synchronization operation thereof. In an embodiment of the present disclosure, examples of the D2D synchronization algorithm may include a time averaging synchronization algorithm, an earliest time synchronization algorithm, a Latest Time Synchronization algorithm, a pulse-coupled oscillator synchronization algorithm, and the like. Each of the algorithms will be described in detail below.

A time point (hereinafter referred to as a "D2D synchronization start time point") according to a start condition of the D2D synchronization period, for example, may be a time point immediately after wireless resources are capable of being used during recognition of the use of wireless resources immediately after a previous superframe period is completed, or in a state where a superframe period does not begin. Also, a time point (hereinafter referred to as a "D2D synchronization completion time point") according to a completion condition of the D2D synchronization period, for example, may be set to a time point of determining whether synchronization has been completed between adjacent D2D communication devices in view of a time period of a cycle (i.e., an Oscillator period; hereinafter referred to as an "OSC cycle") previously determined for the D2D synchronization algorithm.

A transmission time point of a D2D synchronization signal is adjusted according to the above-described D2D synchronization algorithm based on an identical OSC cycle previously determined between D2D communication devices. wherein the transmission time point is not a time interval but transmission timing of synchronization signal. Specifically, in a state where time references for D2D synchronization between adjacent D2D communication devices do not coincide with each other, namely, in an asynchronous state, a D2D communication device detects a D2D synchronization signal transmitted by an adjacent D2D communication device in the OSC cycle. However, when the D2D synchronization signal transmitted by the adjacent D2D communication device is not detected in the OSC cycle, it is determined that time references for D2D communication coincide with each other. According to an embodiment of the present disclosure, each of the D2D communication devices, of which the time references for D2D communication coincide with each other, completes a D2D synchronization period, and performs D2D communication so as to correspond to a discovery period for discovering a D2D communication target and an actual data transmission/reception period, in a superframe structure for D2D communication. According to an embodiment of the present disclosure, even when an adjacent D2D communication device does not exist, a predetermined D2D communication device may complete the above-described D2D synchronization operation, and may perform D2D communication in the D2D superframe structure. However, in this case, the D2D communication device needs to basically perform the D2D synchronization operation regardless of the existence of the adjacent D2D communication device before detecting the existence thereof during the discovery period. Accordingly, in an embodiment of the present disclosure, when the relevant D2D communication device which has entered a discovery period does not detect a discovery signal of the adjacent D2D communication device during the discovery period, the relevant D2D communication device does not perform a communication operation until the remaining superframe period during a subsequently-following D2D data communication period, and is capable of changing to a sleep mode or an idle mode when there is a need for low power consumption.

In contrast, when a D2D synchronization signal of the adjacent D2D communication device exists in the OSC cycle, the relevant D2D communication device regards the existence of the D2D synchronization signal of the adjacent D2D communication device as a non-coincidence in synchronization for D2D communication between the adjacent D2D communication device and the relevant D2D communication device, and continuously performs a D2D synchronization operation without completing the D2D synchronization period. Meanwhile, when a synchronization signal transmitted by another D2D communication device is detected during the D2D synchronization period, the relevant D2D communication device recognizes the existence of another D2D communication device which is adjacent thereto and has a reference time point which does not coincide with a reference time point thereof. In order to cause the reference time point of another D2D communication device to coincide with that of the relevant D2D communication device, the relevant D2D communication device adjusts a related variable for changing a transmission time point of a next D2D synchronization signal according to the D2D synchronization algorithm. As a specific example, a case will be described in which the time averaging synchronization algorithm is used as the D2D synchronization algorithm. Also, in this case, the relevant D2D communication device detects multiple D2D synchronization signals in the OSC cycle. When the relevant D2D communication device records a detection time point of each of the detected multiple D2D synchronization signals before the OSC cycle is completed, the relevant D2D communication device determines a start time point of a next OSC cycle as an average value of the detection time points of the multiple D2D synchronization signals.

As another example, fastest time point or latest time point of detection time points detected during one OSC cycle is used as the D2D synchronization algorithm.

As another example, a case will be described in which the Pulse-Coupled Oscillator (PCO) synchronization algorithm is used as the D2D synchronization algorithm. In this case, differently from the above-described case in which the time averaging synchronization algorithm is used as the D2D synchronization algorithm, the D2D communication device does not determine a start time point of a next OSC cycle, when the OSC cycle is completed. In other words, whenever the D2D communication device detects a D2D synchronization signal transmitted by another D2D communication device in the OSC cycle, the D2D communication device adjusts a start time point of the next OSC cycle. As a specific example, when a typical pulse-coupled synchronization algorithm scheme is employed, if the D2D communication device detects a D2D synchronization signal transmitted by another D2D communication device in the OSC cycle, the D2D communication device may adjust a phase of an oscillator so as to cause a start time point of the next OSC cycle to precede a predetermined start time point. In this case, the change amount of an adjusted phase value of the oscillator is determined by a predetermined mathematical expression. Also, besides the time averaging synchronization algorithm and the PCO synchronization algorithm, various D2D algorithms for D2D synchronization may exist. For example, a method may be applied in which a common OSC cycle is determined, a start time point of the common OSC cycle is changed according to a D2D synchronization signal detected in the common OSC cycle, and a D2D synchronization signal is transmitted at a time point determined by using the changed start time point of the common OSC cycle as a reference. In an embodiment of the present disclosure, for convenience of description, a case will be described in which a start time point of an OSC cycle coincides with a transmission time point of a D2D synchronization signal. However, according to another embodiment of the present disclosure, a transmission time point of a D2D synchronization signal may be determined at a predetermined time point included in an OSC cycle.

Further, separately from whether a synchronization signal of another D2D communication device has been detected during the D2D synchronization period, the relevant D2D communication device identifies an energy level measured by an energy sensing unit in order to identify whether a legacy device or other interference signals exist. The relevant D2D communication device compares the measured energy level with a predetermined threshold energy level. Based on a result of the comparison, the relevant D2D communication device determines whether an interference signal exists. Specifically, when the measured energy level is higher than or equal to the threshold energy level, the relevant D2D communication device determines that the interference signal exists, and temporarily stops the D2D synchronization operation during the D2D synchronization period. After a predetermined time period, the relevant D2D communication device again compares a measured energy level with the predetermined threshold energy level. When a result of the comparison shows that the measured energy level is lower than the threshold energy level, the relevant D2D communication device determines that the interference signal has disappeared. The relevant D2D communication device proceeds with the stopped D2D synchronization operation. At this time, because there are no changes of variable values required for the D2D synchronization operation while stopping the D2D synchronization operation, the relevant D2D communication device needs to be able to intactly use the variable values when the D2D synchronization operation is resumed.

Figure 4A:
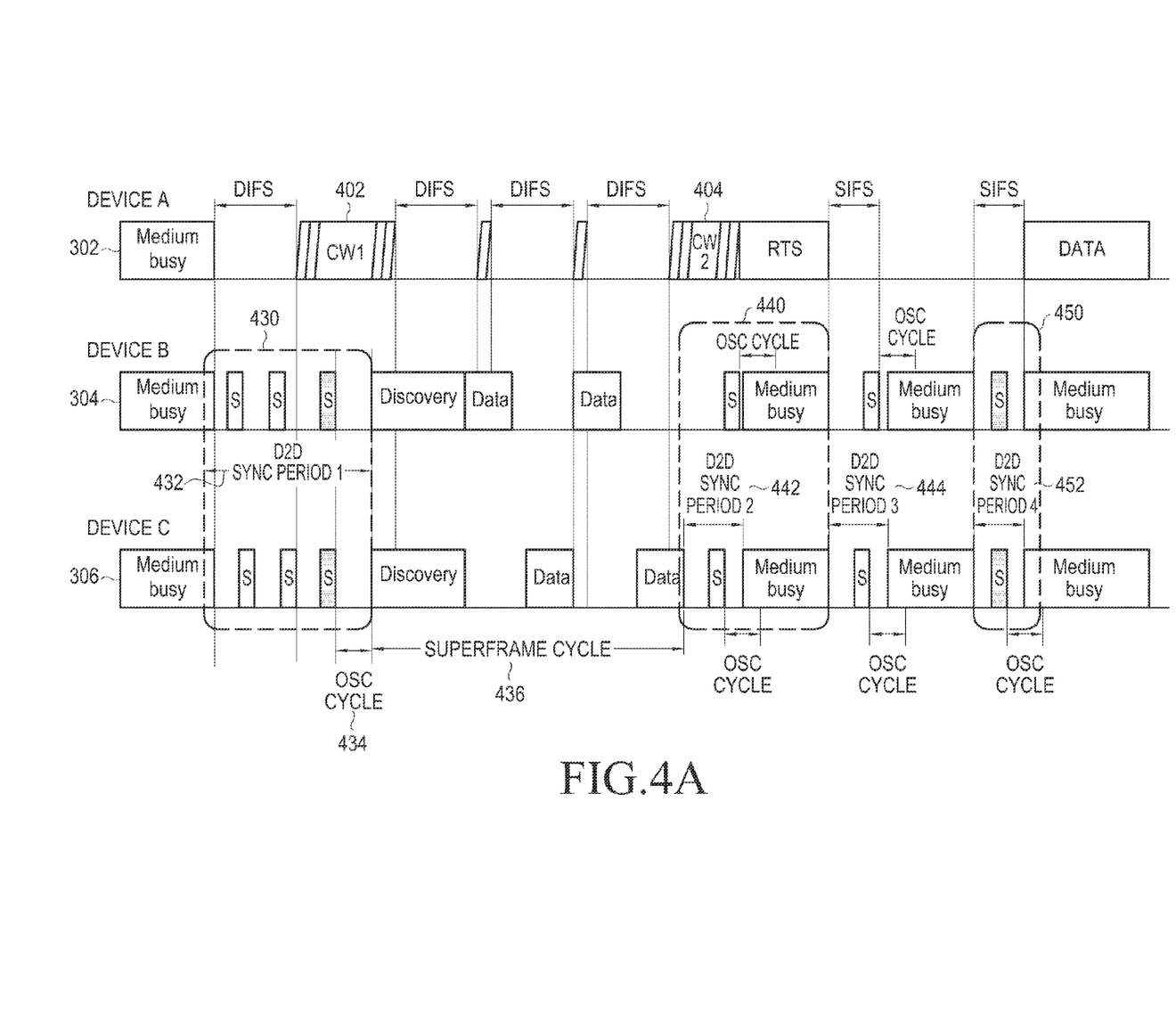
FIG. 4A is a view illustrating a frame structure for accessing a channel by a Device to Device (D2D) communication device in unlicensed frequency bands according to an embodiment of the present disclosure.

FIG. 4A is a view illustrating a frame structure for accessing a channel by a D2D communication device in unlicensed frequency bands according to an embodiment of the present disclosure.

Referring to FIG. 4A, a synchronization process for accessing a channel by the D2D communication device according to an embodiment of the present disclosure may be divided into a total of three situations, and may be described in terms of the total of three situations.

First, a first situation 430 is considered as a case in which the device B transmits a D2D synchronization signal during a D2D synchronization period 1 432 and a D2D synchronization signal transmitted by another D2D communication device is detected during the D2D synchronization period 1 432. In this case, the device B 304 may adjust a start time point of an OSC cycle, according to the above-described D2D synchronization operation. Also, in this case, through the adjustment, time references for D2D synchronization between the D2D communication devices coincide with each other. The device B 304 and the device C 306 both identify that a new D2D synchronization signal has not been detected during an OSC cycle 434 included in the D2D synchronization period 1 432, and thereby identify that their respective time references (i.e., D2D synchronization) coincide with each other. Accordingly, each of the device B 304 and the device C 306 completes the D2D synchronization period 1 432, and enters a superframe cycle for D2D communication.

A second situation 440 is considered as a case in which there is a non-coincidence in synchronization between the D2D communication devices during a D2D synchronization period 2 442. For example, consideration is given to a state in which the device B 304 receives a D2D synchronization signal that the device C 306 has transmitted during the D2D synchronization period 2 442. At this time, a situation is expressed in which the D2D synchronization period 2 442 is temporarily stopped when another communication standard (e.g., that the device A 302 is accessing a medium) is identified in one OSC cycle after a synchronization signal lastly transmitted during the D2D synchronization period 2 442.

Lastly, a third situation 450 is considered as a situation in which the device B 304 and the device C 306 adjust start time points of respective OSC cycles in every situation where the repetition of the second situation 440 causes synchronization signals not to coincide with each other and thereby cause the start time points of the respective OSC cycles to finally coincide with each other, and D2D synchronization signals of each other are not detected in the respective OSC cycle (i.e., the D2D synchronization signals coincide with each other). At this time, a situation is expressed in which a D2D synchronization period 4 452 is also temporarily stopped when the D2D synchronization signals of each other are not received in the respective OSC cycle but another communication standard (i.e., that the device A 302 is accessing the medium) is identified.

In other words, with respect to the entry to the superframe period for D2D communication according to an embodiment of the present disclosure, only when a coincidence exists in D2D synchronization between the D2D communication devices and a D2D synchronization signal transmitted by another D2D device or a signal of another D2D device is not sensed in an OSC cycle, a D2D synchronization period may be completed, and D2D communication during the superframe period may be performed. An example of the first situation 430 according to this configuration will be described as follows.

In the first situation, when a "medium busy" state in which a particular medium is being used is completed, the device A 302 which is a device according to the Wi-Fi standard as illustrated in FIG. 3 enters a DIFS period, and identifies whether another medium being used exists.

In comparison, when each of the device B 304 and the device C 306 which is a D2D communication device senses the completion of the "medium busy" state, each of the device B 304 and the device C 306 starts or resumes a D2D synchronization period, and transmits a D2D synchronization signal according to a mutual D2D synchronization operation. When sensing the existence of a D2D synchronization signal of another D2D communication device during the D2D synchronization period 1 432, each of, the device B 304 and the device C 306 adjusts a start time point of a next OSC cycle, according to a determined mutual D2D synchronization operation. Here, consideration is given to a case in which the device B 304 and the device C 306 recognize synchronization signals of each other and transmission time points of third synchronization signals of each other coincide. At this time, each of the device B 304 and the device C 306 identifies that a synchronization signal is not detected in an OSC cycle which follows the D2D synchronization period 1 432, and thereby recognizes a coincidence in synchronization for D2D communication. According to an embodiment of the present disclosure, a case is described in which a D2D synchronization signal transmitted by a D2D communication device is set as a signal having a form in which energy is not detected by a device (e.g., the device A 302) according to another communication standard. Each of the device B 304 and the device C 306, which identifies that another D2D synchronization signal or a signal of another device is not detected in the OSC cycle 434 and thereby identifies a coincidence in synchronization for D2D communication, enters a superframe cycle 436 for performing D2D communication. The superframe cycle 436 includes a discovery period and a period during which actual D2D communication signals are transmitted and received. As a specific example, a case is described in which the device B 304 and the device C 306 identify each other as D2D communication targets during their respective discovery periods in the superframe cycle 436. The device B 304 transmits data to the device C 306, and the device C 306 transmits a response signal in response to the transmission of the data. A superframe period according to an embodiment of the present disclosure may further include an additional period (e.g., a paging period, a broadcast period, a group communication period, and the like) if necessary, as well as the superframe cycle 436 including the discovery period and the data transmission/reception period as exemplified above.

Meanwhile, a CW1 period 402 of the device A 302 includes a time point, at which generation cycles of third synchronization signals of the device B 304 and the device C 306 coincide with each other during the D2D synchronization period 1 432, and a partial time period of a discovery period included in the superframe cycle 436. In this case, as described above, D2D synchronization signals, that the D2D communication devices have transmitted according to an embodiment of the present disclosure, do not have energy detected by the device A 302 complying with another communication standard. Accordingly, the D2D synchronization signals do not affect a backoff count reduction operation of the device A 302. However, a signal generated during a discovery period is a broadcast signal, and is a signal detected by the device A 302. Accordingly, the device A 302 which has received discovery signals of the device B 304 and the device C 306 during the CW1 period 402, senses that an energy level is higher than or equal to a threshold through a carrier sensing operation, similarly to a CSMA/CA-based channel access operation according to the typical Wi-Fi, and again senses a carrier after a DIFS period in a state maintaining a current backoff counter. Because the device B 304 again transmits data at a time point when the device A 302 senses a carrier, the device A 302 again senses that an energy level is higher than or equal to the threshold, again senses a carrier after a DIFS period, and repeats the above-described operation until an energy level is lower than the threshold.

Next, the second situation 440 and the third situation 450 represent a situation in which D2D synchronization signals do not coincide with each other during a D2D synchronization period, or a situation in which a signal of another device is detected in an OSC cycle and D2D communication is abandoned although the D2D synchronization signals coincide with each other.

In the second situation 440, the device A 302 resumes an operation of a backoff counter as shown during a CW2 period 404, from a time point when an energy level is lower than or equal to the threshold. When an energy level is still lower than or equal to the threshold at a time point at which the backoff counter has a value of 0, the device A 302 starts a process for transmitting data by transmitting an RTS message. In comparison, when the superframe cycle 436 has been completed, each of the device B 304 and the device C 306 again enters the D2D synchronization period 2 442. As described above, D2D synchronization signals that the device B 304 and the device C 306 respectively transmit during the D2D synchronization period 2 442, are not detected by the device A 302. In this regard, the device A 302 senses a carrier during the CW2 period 404, and does not sense a signal of another device which is communicating with a medium, and thus enters an RTS period.

In comparison, the device B 304 and the device C 306 are in a state where their respective D2D synchronization signals do not coincide during the D2D synchronization period 2 442. In this case, the device C 306 senses a D2D synchronization signal of the device B 304 in an OSC cycle during a synchronization period 3 444, and thereby recognizes a non-coincidence in D2D synchronization. Moreover, each of the device B 304 and the device C 306 senses an RTS frame of the device A 302 in the OSC cycle, temporarily stops the synchronization period, and enters a state in which whether a "medium busy" state exists is being recognized as carrier sensing. In this case, a non-coincidence also exists in synchronization during the synchronization period 2 442, and thus the device B 304 and the device C 306 adjust transmission time points of start time points or synchronization signals of their respective OSC cycles.

Thereafter, consideration is given to a case in which synchronization signals of the device B 304 and the device C 306 coincide with each other during the D2D synchronization period 4 452 which again arrives in the third situation 450. In this case, if each of the device B 304 and the device C 306 do not receive another D2D synchronization signal or an interference signal in an OSC cycle during the D2D synchronization period 4 452, it may be determined as a coincidence in synchronization. However, each of the device B 304 and the device C 306 detects that resources are being used, by sensing a carrier with respect to the transmission of data by the device A 302 in the OSC cycle. An example is described in which the data is data that the device A 302 transmits in response to a CTS that the device D illustrated in FIG. 3 has transmitted so as to correspond to the above-described RTS period. Accordingly, although the device B 304 and the device C 306 have a coincidence in D2D synchronization for D2D communication there between, each of the device B 304 and the device C 306 has recognized that the device A 302 is accessing a medium, and thus temporarily stops a D2D synchronization period and enters a "medium busy" state.

Figure 4B:
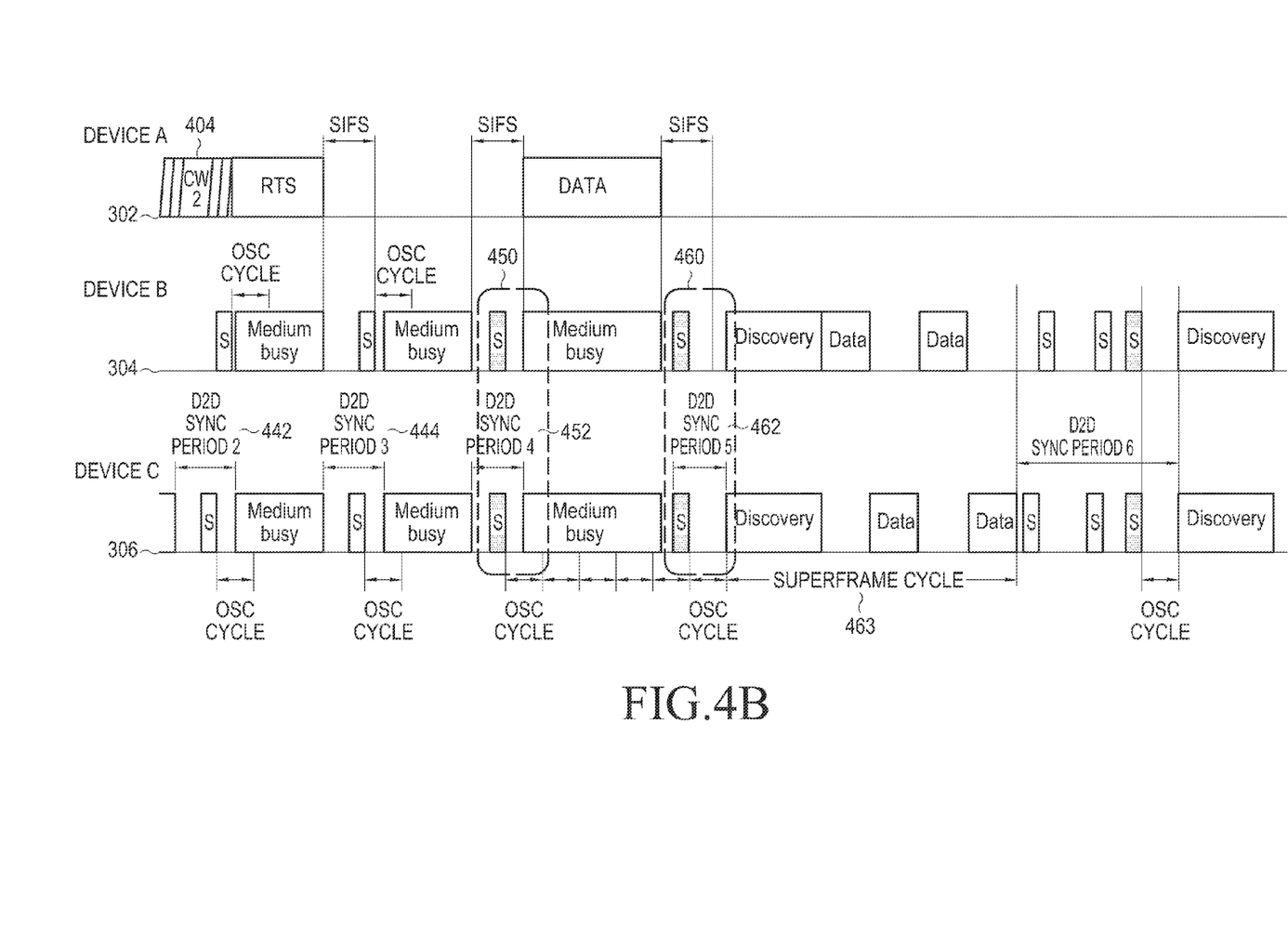
FIG. 4B is a view illustrating a frame structure for accessing a channel by a D2D communication device in unlicensed frequency bands according to an embodiment of the present disclosure.

FIG. 4B is a view illustrating a frame structure for accessing a channel by a D2D communication device in unlicensed frequency bands according to an embodiment of the present disclosure.

Herein, FIG. 4B illustrates an example of another situation which may follow the third situation illustrated in FIG. 4A.

Referring to FIG. 4B, the device A 302 enters a SIFS period after a data frame. Because the device B 304 and the device C 306 already have a coincidence in D2D synchronization there between during the synchronization period 4 452, subsequently, the device B 304 and the device C 306 continuously have the coincidence in D2D synchronization. However, sensing of data of the device A 302 causes a "medium busy" situation to occur in an OSC cycle after transmission of a D2D synchronization signal in a state of the coincidence in D2D synchronization, and thus a D2D synchronization period is stopped. Thereafter, when the "medium busy" situation is released, the device B 304 and the device C 306 again resume a D2D synchronization period. Finally, a signal of another D2D device or an interference signal is not detected in the OSC cycle after transmission of a D2D synchronization signal in a fourth situation 460. Accordingly, the device B 304 and the device C 306 both complete the D2D synchronization period 5 462, enter a superframe cycle 463, and perform D2D communication. At this time, an operation for the D2D communication is identical to the operation in the superframe cycle 436 illustrated in FIG. 4A. Accordingly, a repeated description will be omitted herein.

Meanwhile, when the synchronization period has been completed and a superframe cycle is entered, a time reference of a superframe may be reported by using another synchronization signal distinguished from a synchronization signal used during the synchronization period. Also, a cycle of the synchronization signal used during the synchronization period may be different from that of a synchronization signal used during a superframe period. More specifically, differently from the synchronization signal used during the synchronization period, the synchronization signal used during the superframe period may have a form of a beacon including a message. In order to allow a beacon including a message to be transmitted without a collision, the transmission of a beacon by a potential adjacent terminal may be sensed, and a backoff operation (e.g., a typical CSMA-CA operation) may be performed according to a result of the sensing. When performing the backoff operation related to the beacon, in order to notify a terminal, which receives a beacon, of a reference time point of a superframe, the terminal which transmits the beacon may transmit the beacon which carries time offset information representing a difference between the reference time point of the superframe and a transmission time point of the beacon.

Figure 5:
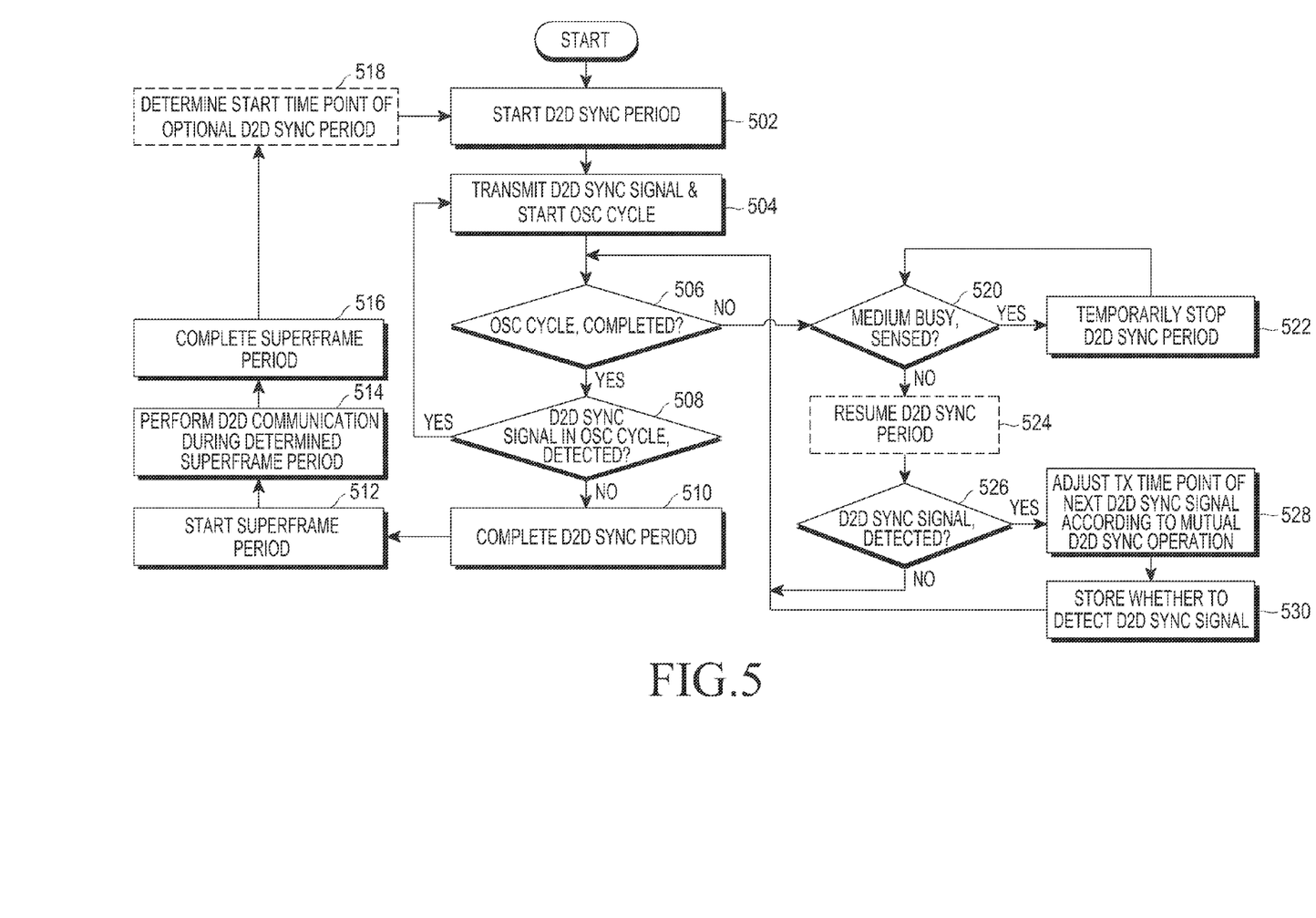
FIG. 5 is a flowchart illustrating a synchronization operation for accessing a channel by a D2D communication device in an unlicensed frequency band in which a legacy device coexists according to an embodiment of the present disclosure.

FIG. 5 is a flowchart illustrating a synchronization operation for accessing a channel by a D2D communication device in an unlicensed frequency band in which a legacy device coexists according to an embodiment of the present disclosure.

Referring to FIG. 5, when a D2D communication device intends to perform D2D communication, in operation 502, the D2D communication device starts a D2D synchronization period. During the D2D synchronization period, the D2D communication device performs an operation of D2D synchronization between the D2D communication device and another D2D communication device. Specifically, in operation 504, the D2D communication device transmits a D2D synchronization signal, and starts an OSC cycle from a relevant time point. When starting the OSC cycle, the D2D communication device initializes information on whether a D2D synchronization signal has been detected (i.e., the number of received D2D synchronization signals), whether "medium busy" has been sensed, and the like, which have been stored in the previous OSC cycle.

In operation 506, the D2D communication device determines whether a current time point is a time point of completing the OSC cycle.

When a result of the determination in operation 506 shows that the OSC cycle has been completed, in operation 508, the D2D communication device determines whether a D2D synchronization signal has been detected in the OSC cycle. When the detected D2D synchronization signal does not exist, in operation 510, the D2D communication device completes the D2D synchronization period. Alternatively, according to another embodiment of the present disclosure, in operation 508, the D2D communication device may determine whether a D2D synchronization signal has been detected or "medium busy" has been detected in the OSC cycle. When the detected D2D synchronization signal does not exist and "medium busy" has not been sensed, in operation 510, the D2D communication device may complete the D2D synchronization period. In operation 512, the D2D communication device starts a superframe period for D2D communication. In operation 514, the D2D communication device performs D2D communication during the determined superframe period. For example, consideration is given to a case in which the D2D communication device enters the superframe cycle 436 illustrated in FIG. 4A and the superframe cycle 463 illustrated in FIG. 4B. In this case, when discovering a D2D communication target device during a discovery period in the relevant superframe cycle, the D2D communication device enters a period for transmitting and receiving actual data. When the superframe period is completed in operation 516, in operation 518, the D2D communication device determines an optional time interval, from a completion time point of the superframe period, and starts a synchronization period. Meanwhile, according to another embodiment of the present disclosure, after the completion of the superframe period in operation 516, the D2D communication device may directly return to operation 502 without going through operation 518, and may restart the D2D synchronization period.

When the result of the determination in operation 506 shows that the current time point is included in the OSC cycle, in operation 520, the D2D communication device determines whether "medium busy" has been sensed through carrier sensing. When a result of the determination in operation 520 shows that "medium busy" has been sensed, in operation 522, the D2D communication device temporarily stops the D2D synchronization period, and continuously performs the carrier sensing. Thereafter, when the "medium busy" state is released and the medium is capable of being accessed, in operation 524, the D2D communication device resumes the D2D synchronization period. When the "medium busy" state is not directly sensed in operation 520 without stopping the D2D synchronization period, operation 524 may be omitted.

Meanwhile, when "medium busy" has not been sensed in operation 520, in operation 526, the D2D communication device determines whether a D2D synchronization signal has been detected. When a result of the determination in operation 526 shows that the D2D synchronization signal has been detected, in operation 528, the D2D communication device adjusts a transmission time point of a next D2D synchronization signal, according to the above-described mutual D2D synchronization operation. According to an embodiment of the present disclosure, a case has been described in which a transmission time point of a D2D synchronization signal is equal to that of an OSC cycle. Therefore, a completion time point and a start time point of the OSC cycle are also adjusted together according to the adjustment operation in operation 528. After adjusting the transmission time point of the D2D synchronization signal, in operation 530, the D2D communication device stores, in a memory thereof, whether the D2D synchronization signal has been detected or the count number of the detected synchronization signals. In operation 528, use is made of whether the D2D synchronization signal has been detected, which is stored in operation 530. When the D2D synchronization signal has not been detected in operation 526, the D2D communication device returns to operation 506.

Figure 6:
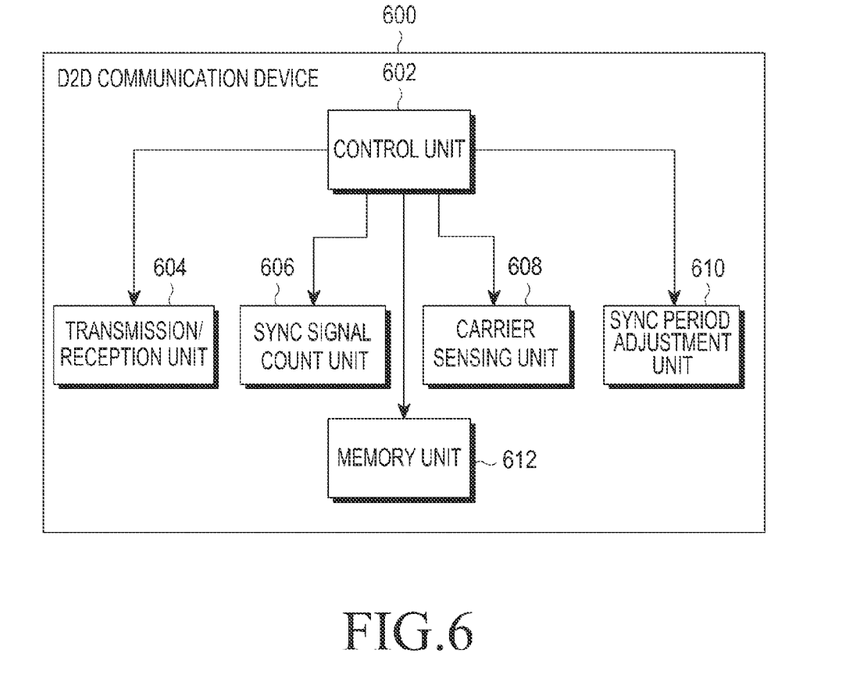
FIG. 6 is a block diagram illustrating a configuration of a D2D communication device, which accesses a channel in an unlicensed frequency band in which a legacy device coexists, according to an embodiment of the present disclosure.

FIG. 6 is a block diagram illustrating a configuration of a D2D communication device which accesses a channel in an unlicensed frequency band, in which a legacy device coexists, according to an embodiment of the present disclosure.

In FIG. 6, a D2D communication device 600 also corresponds to the device B 304 or the device C 306, which is located in the communication system environment illustrated in FIG. 3.

Referring to FIG. 6, the D2D communication device 600 includes a control unit 602, a transmission/reception unit 604, a synchronization signal count unit 606, a carrier sensing unit 608, a synchronization period adjustment unit 610, and a memory unit 612 which is used in common, but is not limited thereto. The synchronization period adjustment unit 610 may be applied to all other communications (e.g., all possible communications which use unlicensed frequency bands, such as Wi-Fi, Bluetooth, Cellular, and the like) as well as the D2D communication.

When determining that the D2D communication device 600 is to perform D2D communication, the control unit 602 starts a D2D synchronization period, and controls the synchronization signal count unit 606 to reset the number of detected synchronization signals, which have previously been counted, to zero.

During the D2D synchronization period, the control unit 602 controls the synchronization period adjustment unit 610 and transmits a D2D synchronization signal through the transmission/reception unit 604. In the present example, the D2D synchronization signal is configured to have a form in which energy is not detected by devices according to other communication standards, which perform communication in unlicensed frequency bands.

After the transmission of the D2D synchronization signal, the control unit 602 determines whether an OSC cycle has been completed. When a result of the determination shows that the OSC cycle has been completed, the control unit 602 determines whether a D2D synchronization signal is detected in the OSC cycle. When no D2D synchronization signal is detected in the OSC cycle, the control unit 602 determines that the relevant D2D communication device has a coincidence in D2D synchronization between itself and another D2D communication device, and controls the transmission/reception unit 604 to perform D2D communication with another D2D communication device in a superframe cycle for D2D communication. The superframe cycle, for example, is one of the superframe cycle 436 of FIG. 4A and the superframe cycle 463 of FIG. 4B as described above. As an example, the superframe cycle may include a discovery period for discovering a D2D communication target device, and a period for transmitting and receiving data to and from another discovered D2D communication device. Alternatively, as another example, the superframe cycle may further include an additional period (e.g., a paging period, a broadcast period, a group communication period, and the like).

In contrast, when the OSC cycle has not been completed after the transmission of the D2D synchronization signal, the control unit 602 controls the carrier sensing unit 608 to determine whether "medium busy" has been sensed. When a result of the determination shows that "medium busy" has been sensed, the control unit 602 temporarily stops the D2D synchronization period, and controls the carrier sensing unit 608 to continuously determine whether "medium busy" is sensed. Thereafter, when it is determined that "medium busy" is no longer sensed, the control unit 602 resumes the stopped D2D synchronization period, and controls the transmission/reception unit 604 to detect whether a D2D synchronization signal has been received during the resumed D2D synchronization period. Also, when another D2D synchronization signal has been detected, the control unit 602 controls the synchronization period adjustment unit 610 to adjust a transmission time point of a next D2D synchronization signal. The control unit 602 may control the synchronization signal count unit 606 to, for example, count the number of the detected D2D synchronization signals. Alternatively, as another example, the control unit 602 may simply store whether a D2D synchronization signal has been detected, as 1-bit information.

According to various embodiments of the present disclosure, when a signal of another device or another synchronization signal is not received during a preset time period within a D2D synchronization period after transmission of a D2D synchronization signal during the D2D synchronization period in unlicensed frequency bands in which legacy devices coexist, D2D communication is performed, so that multiple devices may perform synchronized D2D communication while coexisting with the existing legacy devices.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing synchronization for a device-to-device (D2D) communication system, the method comprising:
   determining, by a first device, whether a second synchronization signal is detected during a scanning period within a synchronization period, the second synchronization signal being transmitted by a second device; and
   if the second synchronization signal is detected by the first device, adjusting, by the first device, a transmission timing of a first synchronization signal to regulate transmission timings of the first device and the second device.

2. The method of claim 1, wherein, if the second synchronization signal is not detected by the first device, the first device and the second device have a same transmission timing.

3. The method of claim 1, wherein a transmission timing of the second synchronization signal is different from the transmission timing of the first synchronization signal.

4. The method of claim 1, further comprising:
transmitting, by the first device, the first synchronization signal based on random access between devices.

5. The method of claim 4, wherein, after the transmitting of the first synchronization signal at the first device, performing, by the first device, a back off procedure until a back off counter of the first device becomes zero.

6. The method of claim 1, wherein the first device and the second device use an unlicensed frequency band for the D2D communication.

7. A device for performing synchronization for a device-to-device (D2D) communication system, the device comprising:
a transceiver configured to transmit and receive signals; and
a controller configured to:
determine, by the device as a first device, whether a second synchronization signal is detected during a scanning period within a synchronization period, the second synchronization signal being transmitted by a second device, and
if the second synchronization signal is detected through the transceiver, adjust a transmission timing of a first synchronization signal to regulate transmission timings of the first device and the second device.

8. The device of claim 7, wherein, if the second synchronization signal is not detected by the first device, the first device and the second device have a same transmission timing.

9. The device of claim 7, wherein a transmission timing of the second synchronization signal is different from the transmission timing of the first synchronization signal.

10. The device of claim 7, wherein the transceiver is configured to transmit the first synchronization signal based on random access between devices.

11. The device of claim 10, wherein, after transmitting the first synchronization signal at the first device, the controller is further configured to perform a back off procedure until a back off counter of the first device becomes zero.

12. The device of claim 7, wherein the first device and the second device use an unlicensed frequency band for the D2D communication.

* * * * *